(12) United States Patent
Banna et al.

(10) Patent No.: US 8,559,573 B2
(45) Date of Patent: Oct. 15, 2013

(54) COMMUNICATIONS CIRCUIT AND METHOD WITH RE-POSITIONABLE SAMPLING SPAN

(75) Inventors: Rami Banna, Kensington (AU); Tomasz T. Prokop, San Jose, CA (US); Long Ung, Marrickville (AU); Dominic Wing-Kin Yip, Carlingford (AU)

(73) Assignee: Agere Systems LLC, Allentown, PA (US)

( * ) Notice: Subject to any disclaimer, the term of this patent is extended or adjusted under 35 U.S.C. 154(b) by 1921 days.

(21) Appl. No.: 11/318,812

(22) Filed: Dec. 27, 2005

(65) Prior Publication Data

US 2007/0147560 A1    Jun. 28, 2007

(51) Int. Cl.
*H04B 1/10*    (2006.01)
(52) U.S. Cl.
USPC ............ 375/350; 375/229; 375/232; 375/316
(58) Field of Classification Search
USPC .......................... 375/229, 231, 232, 350, 316
See application file for complete search history.

(56) References Cited

U.S. PATENT DOCUMENTS

| 2002/0114385 A1* | 8/2002 | Gu et al. ...................... 375/231 |
| 2004/0161029 A1* | 8/2004 | Malladi et al. ................ 375/232 |
| 2005/0129105 A1* | 6/2005 | Papasakellariou ............ 375/232 |
| 2006/0171451 A1* | 8/2006 | Pietraski et al. ............... 375/232 |

OTHER PUBLICATIONS

Haykin, S., "Adaptive Filter Theory," Publishing House of Electronics Industry, Beijing, 3$^{rd}$ Ed., pp. 365-482, 562-629 (1996).
Anonymous, "Universal Mobile Telecommunications System (UMTS); Terminal Conformance Specification, Radio Transmission and Reception (FDD), 3GPP TS 34.121 V6.0.0," pp. 1-20, 492-495 (Mar. 2005).
Anonymous, "3$^{rd}$ Generation Partnership Project; Technical Specification Group Radio Access Network; Spreading and modulation (FDD), 3GPP TS 25.213, V5.5.0" (Dec. 2003).
Anonymous, "3$^{rd}$ Generation Partnership Project; Technical Specification Group Radio Access Network; Physical channels and mapping of transport channels onto physical channels (FDD), 3GPP TS 25.211, V5.6.0" (Sep. 2004).
Hooli, K. "Equalization in WCDMA Terminals," Department of Electrical and Information Engineering, Univeristy of Oulu, Finland (2003).

* cited by examiner

*Primary Examiner* — Leila Malek
(74) *Attorney, Agent, or Firm* — Ryan, Mason & Lewis, LLP

(57) ABSTRACT

A communications circuit includes a filter module with a sampling window, a control module, and an input buffer. The control module has a ray parameter interface to obtain information regarding significant ray changes that make it desirable to re-position the sampling window. The control module determines re-positioning parameters, responsive to this information, which reflect the re-positioning of the sampling window. The input buffer obtains samples of a received signal and outputs received signal data to the filter module. The filter module obtains the re-positioning parameters from the control module, and the filter module and control module temporally re-position the sampling window in duration and/or location in accordance with the re-positioning parameters, and output a filtered chip.

6 Claims, 16 Drawing Sheets

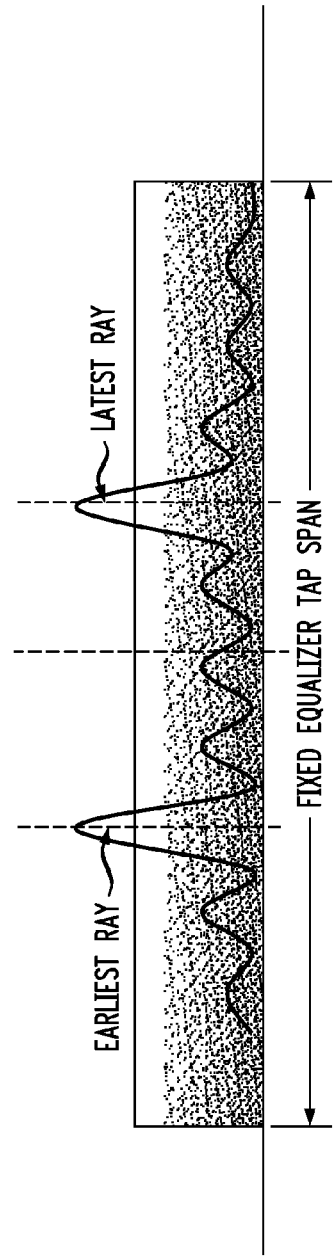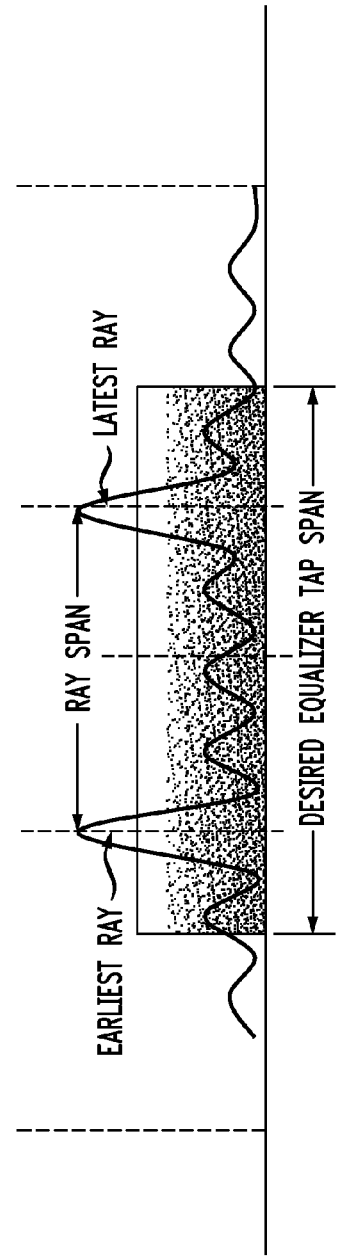

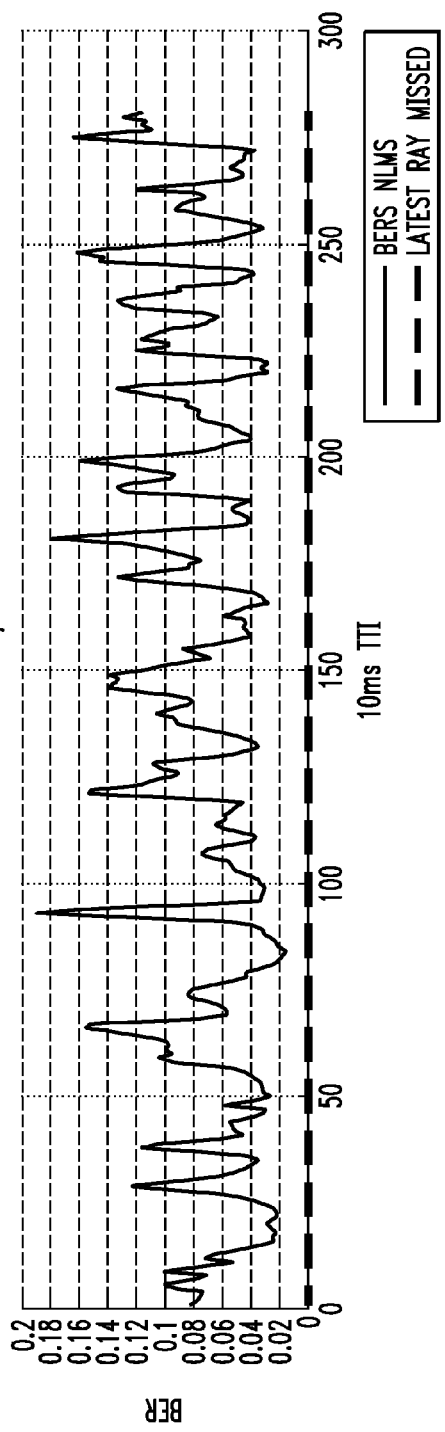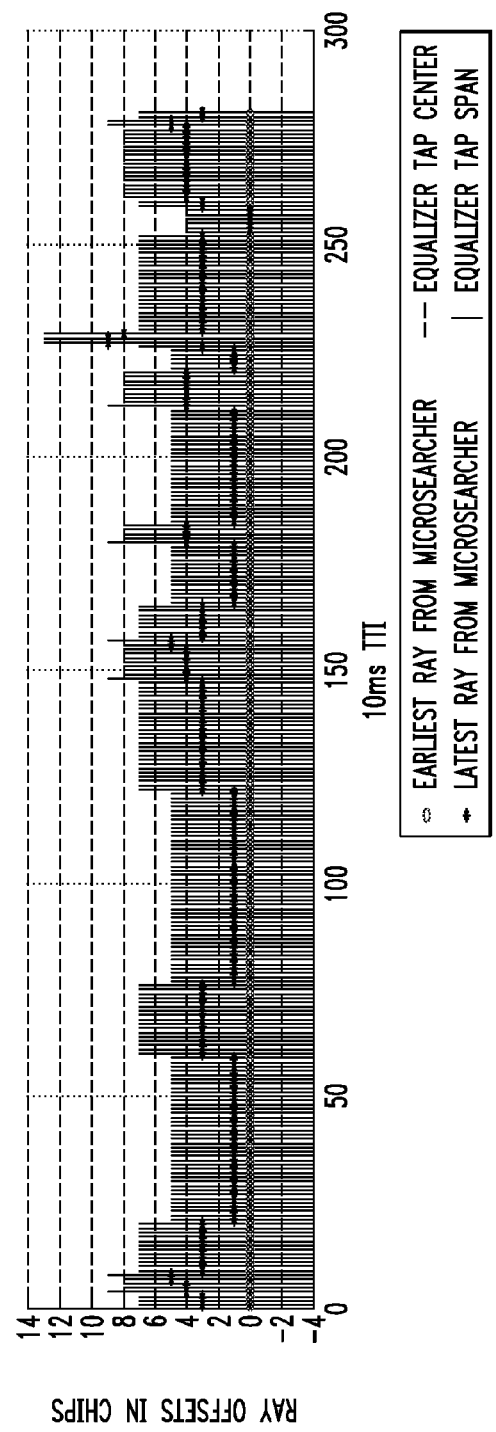
FIG. 13

COMMUNICATIONS CIRCUIT AND METHOD WITH RE-POSITIONABLE SAMPLING SPAN

FIELD OF THE INVENTION

The present invention relates generally to communications circuits, and more particularly relates to a circuit, such as an equalizer receiver, having a sampling span.

BACKGROUND OF THE INVENTION

Communications circuits, including receivers such as mobile handsets, may be employed under conditions where the handset moves. For example, the handset may be on the person of a pedestrian, or may be located in an automobile. Due to different propagation paths, different versions of signals from a transmitter will arrive at the mobile handset at different times. The different versions of the signal that have traveled different paths are referred to as rays. As the mobile handset moves, the paths, number of reflections, propagation times, and thus the rays change.

Modern telecommunications systems, such as that specified in the Third Generation Partnership Project (3GPP) Universal Mobile Telecommunications System (UMTS) release 5 may require support for high data throughput, such as High Speed Downlink Packet Access (HSDPA). The aforementioned release 5 specifies pedestrian and vehicular channel conditions in which the rays are constantly fixed in the same position. However, in the real world, rays are constantly moving and changing.

Accordingly, it would be desirable to provide an advanced receiver, such as an equalizer receiver, capable of handling the changing ray positions.

SUMMARY OF THE INVENTION

The present invention, in an illustrative embodiment, addresses the needs identified in the prior art. In one aspect, an exemplary communications circuit, which may be implemented as an integrated circuit, includes a filter module having a sampling window, a control module, and an input buffer. The control module has a ray parameter interface configured to obtain information that is indicative of significant ray changes rendering re-positioning of the sampling window desirable. The control module is configured to determine re-positioning parameters, responsive to the information, that reflect the sampling window re-positioning. The input buffer is configured to obtain samples of a received signal and to output received signal data. The filter module is coupled to the input buffer to obtain the received signal data and to the control module to obtain the re-positioning parameters. The filter module and the control module are configured to temporally re-position the sampling window in at least one of duration and location, in accordance with the re-positioning parameters, and to output a filtered chip.

In another aspect, an exemplary communications circuit includes a filter module, control module, and input buffer of the kind just described, and further includes an antenna module that is configured to obtain received signal samples from a signal, and a parameter calculation block that is configured to obtain ray position data indicative of ray positions associated with the signal, and to generate information indicative of significant ray changes, responsive to the ray position data. A microsearcher can be coupled to the parameter calculation block and configured to determine the ray position data and supply it to the calculation block. A decoder module can be coupled to the control module and the filter module, and can perform despreading and/or decoding functions.

In still another aspect, an exemplary method of receiving a plurality of time-varying significant rays in a communications circuit, which can be computer implemented, includes the steps of operating the circuit with first sampling span parameters indicative of a first sampling span, detecting changes in the plurality of rays, and, responsive to the changes, operating the circuit with second sampling span parameters. The second sampling span parameters can be indicative of a second sampling span that is temporally re-positioned, in at least one of duration and location, with respect to the first sampling span.

A more complete understanding of the present invention, as well as further features and advantages of the present invention, will be obtained by reference to the following detailed description and drawings.

BRIEF DESCRIPTION OF THE DRAWINGS

FIG. 9 depicts a first criteria to be met by a tap span in an exemplary embodiment of the present invention;

FIG. 10 depicts another criteria to be met by a tap span in an exemplary embodiment of the present invention;

FIG. 13 depicts a plot similar to FIG. 12 but in the case where a variable equalizer tap span is employed using certain techniques of the present invention;

DETAILED DESCRIPTION

Figure 1:
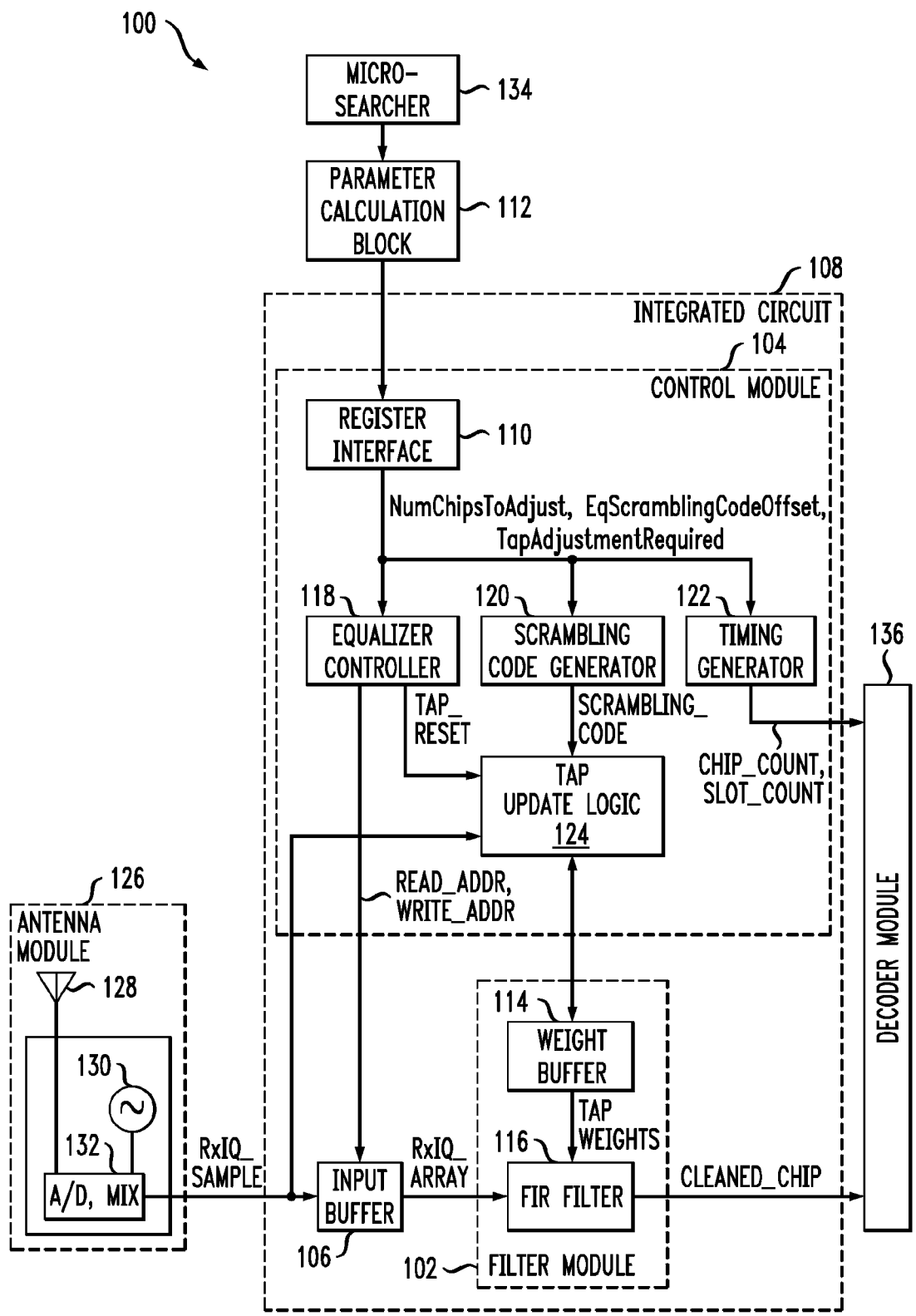
FIG. 1 is a block diagram depicting an exemplary embodiment of a communications circuit in accordance with an aspect of the present invention.

Reference should now be had to FIG. 1, which depicts an exemplary communications circuit 100, in the form of a re-positionable equalizer receiver, in accordance with one aspect of the present invention. Circuit 100 can include a filter module 102, a control module 104, and an input buffer 106. In the exemplary embodiment depicted in FIG. 1, the filter module, control module, and input buffer are implemented on an integrated circuit chip 108. The filter module 102 can have a sampling window. The sampling window refers to a time span during which signal samples are gathered. Such samples can include, for example, data symbols or so-called "chips." A "chip," in this latter context, is intended to encompass a data symbol multiplied by, for example, a spreading code (e.g., when using Code Division Multiple Access (CDMA) techniques). In cases where standards such as 3GPP UMTS technical specification (TS) 25.211 are employed, the chip may have been further multiplied with a complex scrambling code, as described in 3GPP standard 25.213. It will be apparent from the context whether the term "chip" refers to an integrated circuit structure, or such a multiplied data symbol.

The control module 104 can have a ray parameter interface, such as register interface 110, that is configured to obtain information indicative of significant ray changes that render re-positioning of the sampling window desirable (of course, updates indicating no significant ray change can also be received). The control module 104 can be configured to determine re-positioning parameters, in response to the information indicative of the significant ray changes. Such re-positioning parameters can reflect the re-positioning of the sampling window.

The input buffer 106 can be configured to obtain samples of a received signal, such as Receiver In-Phase and Quadrature (RxIQ) samples. Input buffer 106 can be further configured to output received signal data, for example, in the form of an RxIQ array. The filter module 102 can be coupled to the input buffer 106 to obtain the received signal data, and can also be coupled to the control module 104 to obtain the re-positioning parameters. The filter module 102 and the control module 104 can be configured to temporally re-position the sampling window in at least one of duration and location, in accordance with the re-positioning parameters, and to output a "filtered" or "cleaned" chip. Stated in another way, the sampling window is re-positioned in time by changing its duration (i.e. size) and/or location.

As will be discussed in greater detail below, in one or more exemplary embodiments of the present invention, the sampling window can be implemented in a filter having a number of taps, and can correspond to a span of the taps. The re-positioning parameters can include, for example, tap masking parameters specifying one or more of the filter taps that are to be masked, and/or can include parameters indicative of freezing or advancing a counter, such as a chip and/or slot counter, as discussed below.

In view of the foregoing discussion, it will be appreciated that in one or more embodiments of the present invention, the re-positioning parameters can include at least tap weights for the filter module 102, determined in accordance with tap masking parameters. The filter module 102 can be configured with a plurality of taps, to be discussed in greater detail below, and the sampling window can correspond to a tap span of the filter module 102. Re-positioning of the sampling window can be accomplished by applying a masking pattern (specified by the masking parameters, e.g.) to the plurality of taps in accordance with the aforementioned tap weights. The masking pattern can be substantially zero outside a desired location of the sampling window, and can be substantially one inside the desired location of the sampling window. As used herein, "substantially zero" means that the value of the mask is zero or approximately zero in most of the region outside the sampling window. While it is preferable that the value be zero in all locations outside the sampling window, one could envision, for example, a case with a single location or a few locations with a "one" value outside the sampling window; so long as these were not so many as to have a significant degrading effect on the masking function, such a case fits within the definition of "substantially zero." Similarly, as used herein, "substantially one" means that the value of the mask is one or approximately one in most of the region within the sampling window. While it is preferable that the value be one in all locations within the sampling window, one could envision, for example, a case with a single location or a few locations with a "zero" value within the sampling window; so long as these were not so many as to have a significant degrading effect on the capture of significant rays, such a case fits within the definition of "substantially zero."

The tap masking parameters can specify that the size of the sampling window is to be changed, that is, they can specify re-positioning at least the temporal duration of the sampling window (note that as used herein, "re-positioning" encompasses both changes in size and changes in location or both). Thus, it will be appreciated that the tap masking parameters could additionally, or alternatively, specify that the temporal location of the sampling window is to be re-positioned. As noted, the re-positioning parameters can include counter parameters that are indicative of counter freezing and/or counter advancing; such re-positioning parameters pertaining to counters can be provided in lieu of or in addition to the tap masking parameters discussed above, and can be used to change the location of the sampling window in time by freezing or advancing a counter. In one form of the invention, tap masking is employed to vary the size and/or location of the sampling window, while counter freezing and/or advancing are employed to change the location of the sampling window when significant rays fall outside of a physical tap span. The circuit 100 can include a parameter calculation block that is external to integrated circuit 108 and interfaces with control module 104 on integrated circuit 108 via register interface 110.

The filter module 102 can include, for example, a weight buffer 114 and a filter 116, such as a Finite Impulse Response (FIR) filter, coupled to the weight buffer. The weight buffer 114 can be coupled to the control module 104 to obtain the re-positioning parameters, and can be configured to provide tap weight data to the filter 116. The control module 104 can include an equalizer controller 118 coupled to the ray parameter interface (such as register interface 110) and to the input buffer 106. Control module 104 can further include a scrambling code generator 120 and a timing generator 122, each coupled to the ray parameter interface. Control module 104 can still further include a tap update logic module 124 that is coupled to the equalizer controller 118 and the scrambling code generator 120. The equalizer controller 118 can be configured to obtain the aforementioned information that is indicative of the significant ray changes, to determine the signal sample information, and to communicate the signal sample information to the input buffer 106. Further, the equalizer controller 118 can be configured to determine tap reset data and communicate the tap reset data to the tap update logic module 124.

In the exemplary embodiment depicted in FIG. 1, the information indicative of the significant ray changes includes the parameters NumChipsToAdjust, EqScramblingCodeOffset, and TapAdjustmentRequired. Pertinent parameters will be discussed further below. The signal sample information can include the parameters read_addr and write_addr. The tap reset data can include the parameter tap_reset. The scrambling code generator 120 can be configured to obtain the aforementioned information indicative of the significant ray changes, and to determine scrambling code data, such as the parameter scrambling_code, and to communicate such data to the tap update logic module 124. The timing generator 122 can be configured to obtain the aforementioned information indicative of the significant ray changes, and to determine counter parameters that are indicative of counter freezing and/or counter advancing. Such counter parameters can include chip_count and slot_count. The parameters discussed herein are exemplary and others could of course be employed. The tap update logic module 124 can be configured to obtain the aforementioned tap reset data and scrambling code data, determine updated weights in accordance with, e.g., the tap masking parameters for the masking pattern, and communicate the updated weights to the weight buffer 114 as per the aforementioned determining and obtaining of re-positioning parameters. The masking pattern can zero out undesired taps, and reset taps as required. As noted, the received signal samples input to buffer 106 and logic 124 can be RxIQ samples.

The control module 104 can have a sample input port configured to obtain samples of the received signal. In the exemplary embodiment depicted in FIG. 1, this is the location where the RxIQ_sample parameter is input to the tap update logic 124. Control module 104 can be configured to determine the aforementioned signal sample information, such as read_addr and write_addr, for example in the aforementioned equalizer controller 118. Thus, the input buffer 106 is coupled to the control module 104 and configured to obtain the signal sample information from the control module (as noted, in the exemplary embodiment of FIG. 1, from the equalizer controller 118 of control module 104). The input buffer outputs RxIQ_array to the filter module 102, for example, to the FIR filter 116. As noted, the aforementioned sampling window can be a tap span of the filter module 102. The received signal array data, RxIQ_array can have a length that is equal to the tap span.

Circuit 100 can also include an antenna module 126 that is configured to obtain received signal samples from a signal. Module 126 can include an antenna 128, an oscillator 130 and a block 132 for performing mixing and analog-to-digital conversion, as well as related functions. In general terms, module 126 includes antenna 128 and any appropriate downconversion circuitry for receiving radio frequency (RF) transmissions and transforming such received signals to baseband signals. Typically, oscillator 130 generates a waveform having a frequency identical to the carrier frequency. Such waveform is typically shifted and multiplied with the output of antenna 128 to generate in-phase and quadrature outputs. Such outputs may then be filtered to remove undesirable out-of-band frequency components. While modern receivers may typically not use intermediate stages producing intermediate frequency (IF) signals, use of such stages with one or more exemplary embodiments of the present invention is believed possible. Thus, module 126 can provide the aforementioned RxIQ samples to input buffer 106, and to control module 104 via tap update logic 124.

Circuit 100 can also include a microsearcher 134 coupled to the parameter calculation block 112 and configured to determine the ray position data and to supply such data to the parameter calculation block 112. Circuit 100 can further include a decoder module 136 that is coupled to the control module 104 (for example, to the timing generator 122) and to the filter module 102 (for example, to the filter 116). The decoder module 136 can be configured to obtain a cleaned or filtered chip designated as "cleaned_chip" from the filter 116 of filter module 102 and can be further configured to obtain counter parameters such as the aforementioned chip_count and slot_count from the control module. Such counter parameters, as noted, can be indicative of counter freezing and/or counter advancing, and can be determined, for example, by the timing generator 122.

The parameter calculation block 112 could be implemented, for example, by software running on a microprocessor or Digital Signal Processor (DSP) on another integrated circuit. The software could then write the appropriate parameters into the register interface 110, so that they can be read by blocks 118, 120, 122. The microsearcher 134 can be implemented, for example, in an application specific integrated circuit (ASIC) or DSP. The microsearcher 134 can provide ray positions to the parameter calculation block 112. The decoder module 136 can perform, for example, despreading and/or decoding functions, and can be implemented in an ASIC or DSP. The blocks on integrated circuit 108 can also be implemented in an ASIC or DSP.

The information indicative of the significant ray changes can include, for example, information indicative of a position of an earliest ray and/or information indicative of a position of a latest ray. As will be discussed below with regard to Priority 1 re-positioning, in one aspect of the present invention, the re-positioning of the sampling window can be conducted such that the earliest ray is located substantially centered in the sampling window. As will be discussed below with respect to Priority 2 re-positioning, the information indicative of the significant ray changes can be generated so as to substantially center the sampling window at a point that is substantially equidistant between the earliest and latest rays. The parameter calculation block 112 can be configured to generate the aforementioned information indicative of significant ray changes so as to substantially capture the full impulse response of the earliest ray and/or the latest ray (preferably the full impulse response of both the earliest and latest rays).

By way of summary, it will be appreciated that due to different propagation paths, different versions of signals from a transmitter can arrive at a receiver at different times. For the sake of a simple example, a signal following a line of sight might arrive first, a signal reflecting once might arrive a short time later, and a signal that reflected twice might arrive a short time later still. The different versions of the signals that have traveled different paths are referred to as rays. As the receiver moves, because of a person walking or driving, for example, the paths, number of reflections, propagation times, and thus the rays change. The taps need to be far enough apart to encompass all, or at least most of, the significant rays. If a fixed tap span is used that is big enough to encompass all the significant rays, it will be too big in most cases and performance will suffer. Accordingly, techniques of the present invention can be employed to adjust the tap span to be just big enough, and properly positioned, so as to encompass all, or at least most, of the significant rays. That is, a re-positionable equalizer receiver according to an aspect of the present invention can realign the equalizer tap span when one or more of the significant rays moves outside the tap span. When this occurs, new parameters can be determined so that most of the significant rays are in the new span. The new parameters can be programmed into the equalizer hardware. The new parameters can include a number of chips to adjust and a scrambling code offset.

Still referring to FIG. 1, additional details of operation will be provided. It will be appreciated that communications circuit 100 is in the form of a re-positionable equalizer receiver, which receives digitized baseband samples (RxIQ_sample) from the antenna module 126. Ray positions are also received from microsearcher 134. Parameter calculation block 112 determines whether re-positioning is necessary, and calculates an amount and direction of re-positioning needed. The re-positioning information is sent via the signals NumChipsToAdjust and EqScramblingCodeOffset, as well as by setting the TapAdjustmentRequired flag. Additional tables and figures will be presented and discussed below, summarizing the signals and flags. If tap span adjustment (i.e., re-positioning) is required, the TapAdjustmentRequired flag will be asserted. Periodically, the equalizer controller 118, scrambling code generator 120, and timing generator 122 blocks check whether the TapAdjustmentRequired flag has been asserted. If it has, the equalizer must re-position the taps to the value of NumChipsToAdjust. If NumChipsToAdjust is negative, re-positioning is to the left, that is, earlier in time. Conversely, if NumChipsToAdjust is not negative, re-positioning is to the right, that is, later in time. In either case, equalizer controller block 118 can reset all the tap weights by asserting the tap_reset signal.

The write_addr and read_addr parameters are supplied to input buffer 106 from equalizer controller 118. Buffer 106 uses write_addr to write a new value for RxIQ_sample into the buffer 106, and employs read_addr to read old values of RxIQ_sample to form the RxIQ_array, with the length of the array typically equal to the tap span for the FIR filter block 116. When the TapAdjustmentRequired flag is asserted, the scrambling code generator block 120 uses the new EqScramblingCodeOffset and NumChipsToAdjust to generate the scrambling_code parameter to the tap update logic 124. Re-positioning to the left requires that the cell's primary scrambling code should be advanced by NumChipsToAdjust. As a result, NumChipsToAdjust worth of chips will be discarded for the current frame. Re-positioning to the right will typically require no changes to the cell's primary scrambling code, but the equalizer controller 118 and the scrambling code generator block 120 need to be idle for a period equal to NumChipsToAdjust worth of chips.

Tap update logic block 124 can employ an adaptive error updating algorithm, such as, for example, the NLMS algorithm, to calculate the tap weights and write the tap weights to the weight buffer block 114. Note that the calculation of the tap weights is essentially an estimate of the channel profile. The tap weights can then be read from the weight buffer block 114 and applied to the received samples in the FIR filter block 116. When the TapAdjustmentRequired flag is asserted, the timing generator block 122 can generate new counter signals chip_count and slot_count based on the value of NumChipsToAdjust. When advancing is done, the chip and slot counters jump ahead, by NumChipsToAdjust mod 2560 in the case of the chip counter and by NumChipsToAdjust/2560 in the case of the slot counter. When freezing is done, the chip and slot counters stay idle for corresponding numbers of chips.

Figure 2:
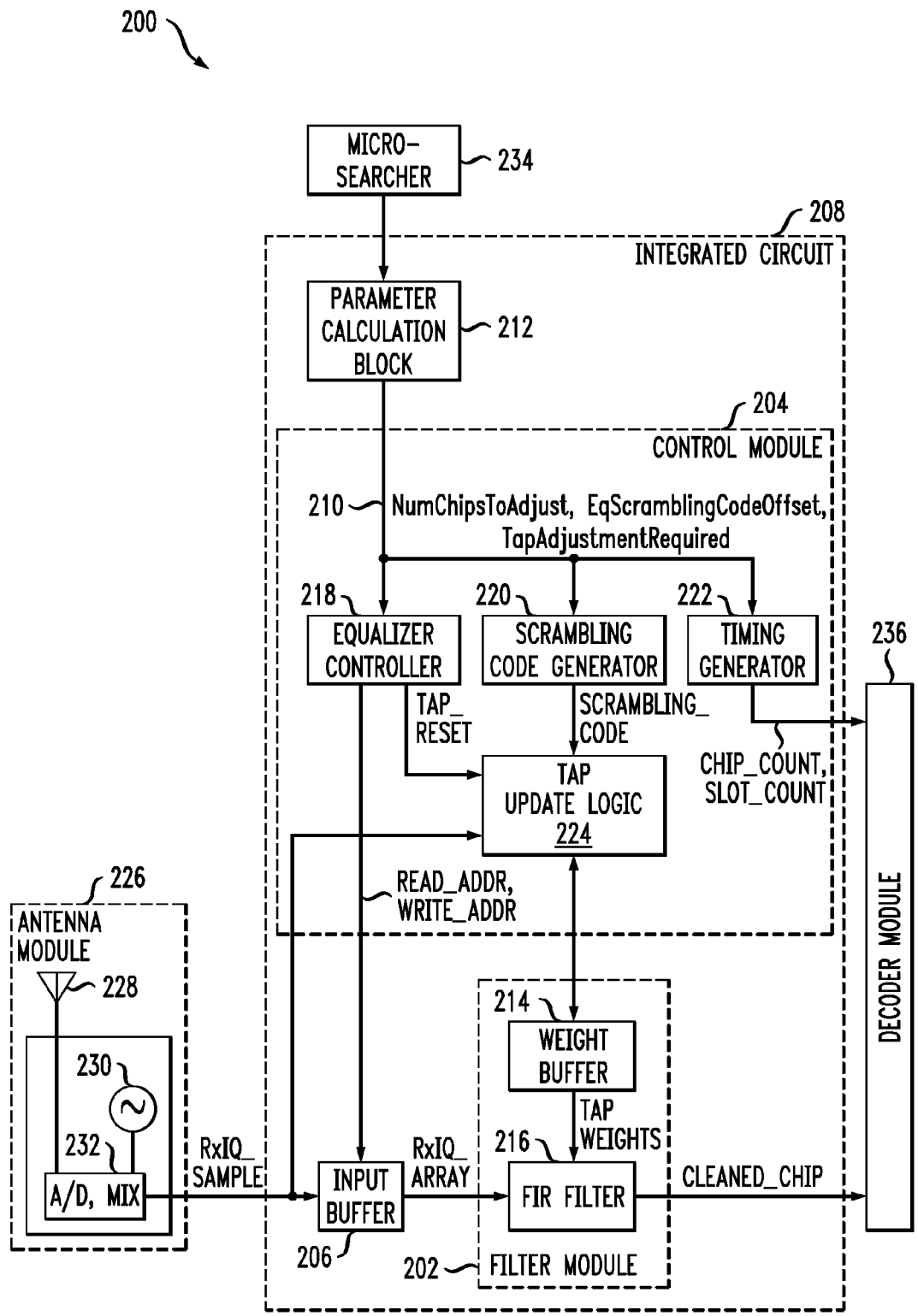
FIG. 2 is a block diagram showing another exemplary embodiment of a communications circuit in accordance with another aspect of the present invention.

It will be appreciated that the circuit shown in FIG. 1 is exemplary, and other circuits employing techniques of the present invention are possible. By way of example and not limitation, one such circuit is shown in FIG. 2. Items in FIG. 2 that are similar to those in FIG. 1 have received the same reference character incremented by 100. As shown in the alternative embodiment of FIG. 2, parameter calculation block 212 is implemented on the same integrated circuit 208 as the control module 204, input buffer 206, and filter module 202. Since parameter calculation block 212 is on the same integrated circuit, the ray parameter interface is simply in the form of interconnections 210 on the integrated circuit 208, and a register interface such as 110 in FIG. 1 need not be employed. Functioning is otherwise similar to the circuit described with regard to FIG. 1. Of course, other alternative embodiments using the techniques of the present invention are also possible.

Further details will now be presented regarding one possible exemplary method by which the parameter calculation block 212 can determine values for parameters such as NumChipsToAdjust and EqScramblingCodeOffset. It should be noted that in comparison to the so-called RAKE receiver, where each "rake" finger is placed at the position of a significant ray, equalizer receivers typically require equalizer taps to span at least from the earliest to the latest significant ray. In order to adapt the equalizer receiver for practical use, appropriate techniques are required to keep track of the ray positions and to determine whether it is necessary to adjust the timing so as to re-position the equalizer taps when one or more significant rays fall outside of the current tap span. Table 1 below summarizes various parameters employed with respect to the description of the techniques of the present invention.

TABLE 1

| | |
|---|---|
| TapSpan | Maximum allocated equalizer Tap span. (TapSpanL and TapSpanR may each be set to TapSpan/2) |
| NumChipsToAdjust | Number of chips to re-position to equalizer tap. |
| EarliestRay | Absolute chip position of the earliest new ray (from microsearcher) |
| LatestRay | Absolute chip position of the latest new ray (from microsearcher) |
| EqScramblingCodeOffset | Represents the timing offset of the center of TapSpan, with respect to the frame boundary, in term of chips |
| RelativeEarliestRay | EarliestRay relative to the EqScramblingCodeOffset |
| RelativeLatestRay | LatestRay relative to the EqScramblingCodeOffset |

Figure 3:
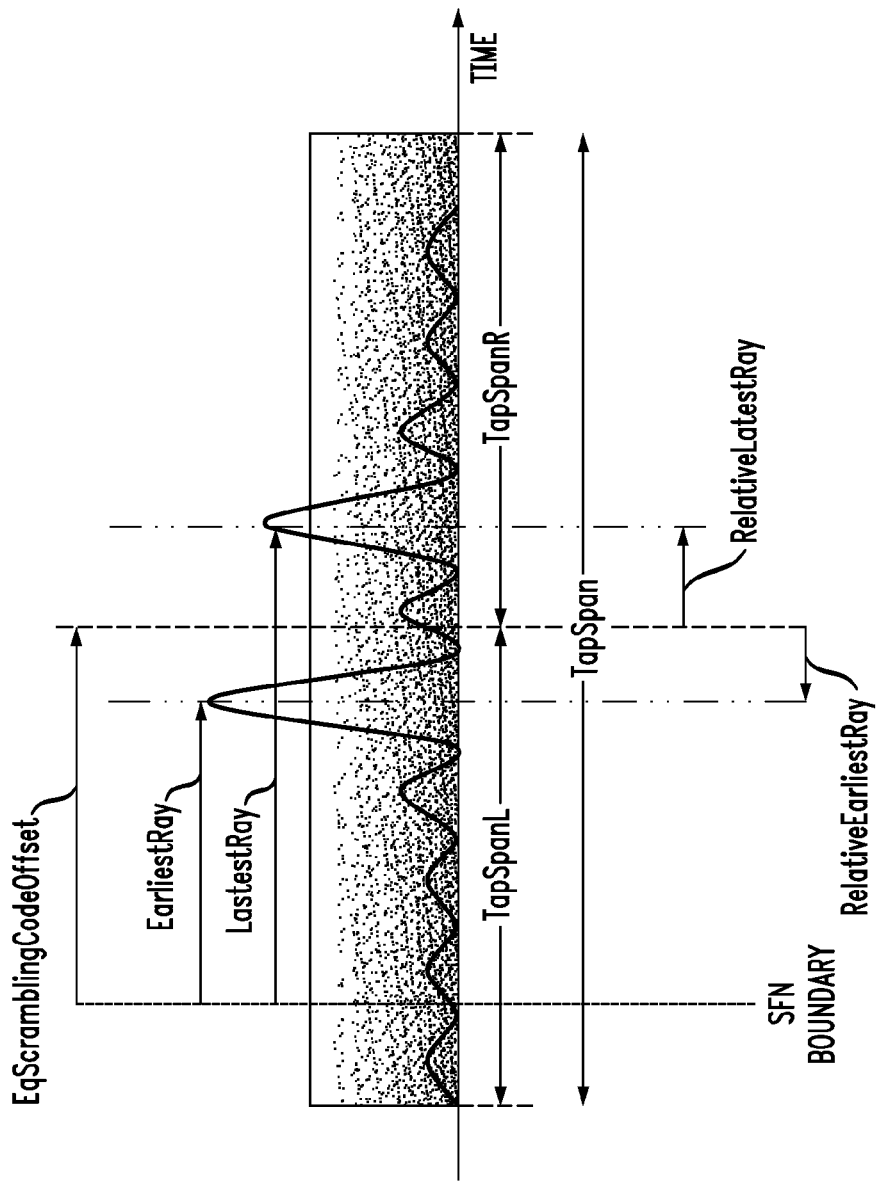
FIG. 3 depicts parameters pertaining to certain techniques of the present invention.

Pertinent parameters from Table 1 are illustrated in FIG. 3. Note that the SFN boundary refers to the Cell System Frame Number. For the base station (denoted in standard nomenclature as NodeB) the SFN boundary value represents the exact timing of the frame boundary for the transmitter. The SFN Boundary in FIG. 3 is essentially the NodeB SFN boundary in time. After going through the channel it produces the earliest and latest rays as shown.

Figure 4:
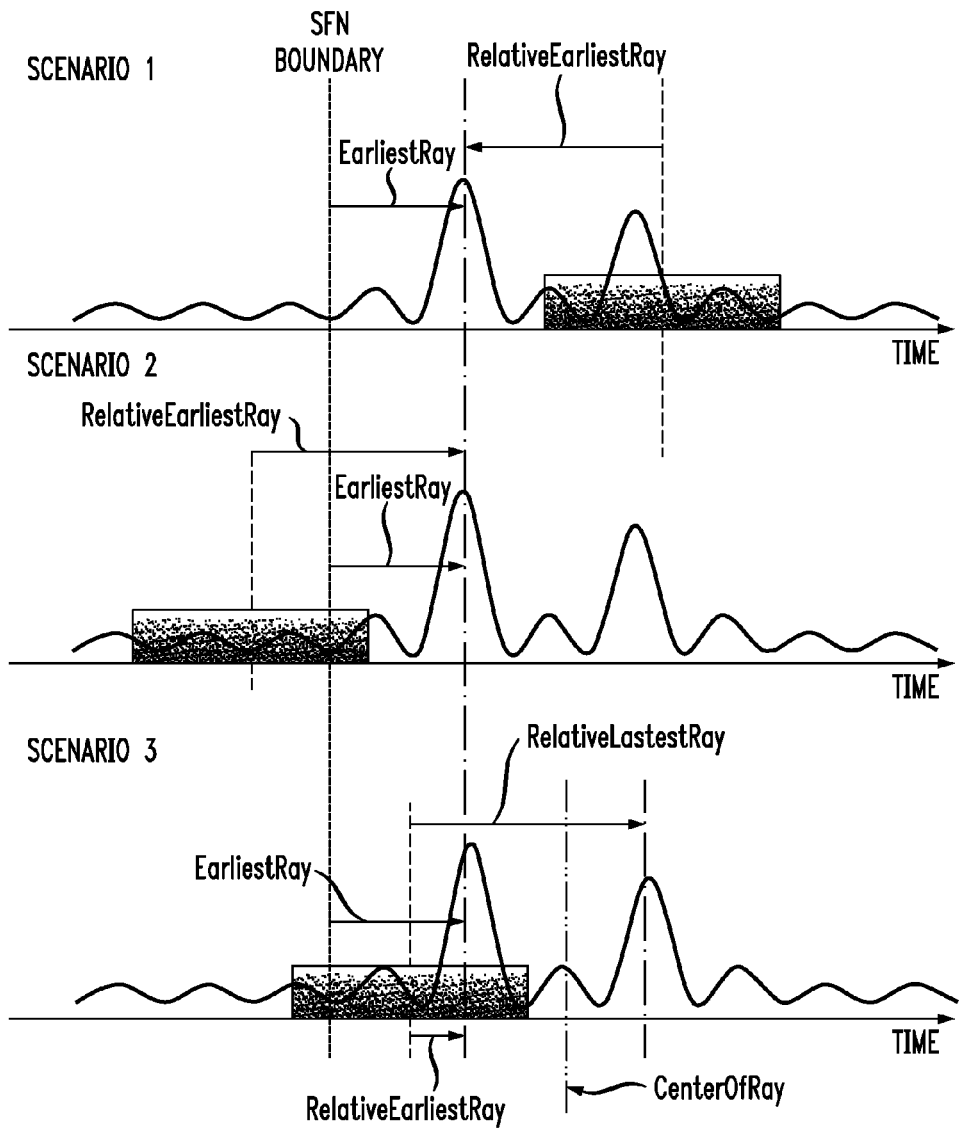
FIG. 4 depicts three possible exemplary scenarios wherein tap re-positioning may be required when employing aspects of the present invention.

In one exemplary scheme employing techniques of the present invention, there are three scenarios where the equalizer embodied in IC 108 requires tap re-positioning. The three scenarios are illustrated with respect to FIG. 4. In Scenario 1, a significant ray falls outside of the equalizer tap span to the left In Scenario 2, a significant ray falls outside of the equalizer tap span to the right. In Scenario 3, the equalizer tap span is too small to cover both the earliest and latest significant rays.

Figure 5:
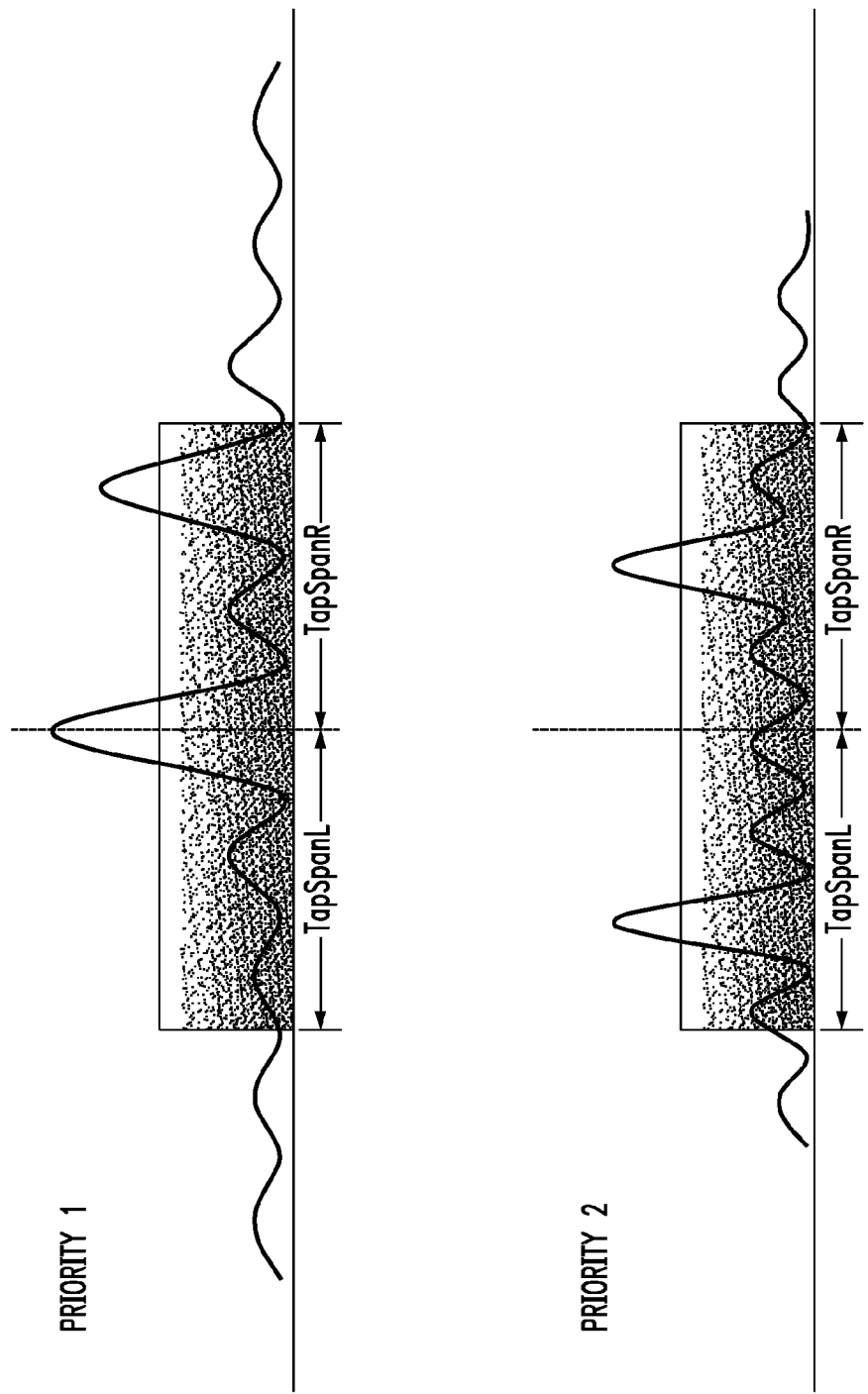
FIG. 5 depicts Priority 1 and Priority 2 re-positioning in accordance with an exemplary embodiment of the present invention.

When equalizer tap re-positioning is required, techniques of the present invention can employ a number of different possible schemes for tap re-positioning. Two such schemes, referred to as Priority 1 and Priority 2, are illustrated in FIG. 5. In the Priority 1 scheme, an effort is made to minimize any need for future tap re-positioning, by attempting to place the earliest ray in the center of the tap span. This allows room for any early rays to appear or drift within the region TapSpanL without requiring tap re-positioning. Accordingly, minimizing equalizer tap re-positioning is expected to have a positive effect on the performance of the equalizer.

In Priority 2 re-positioning, the center of the tap span is moved substantially to the mid-point between the earliest and latest rays, so that both rays are captured. This type of re-positioning is usually preferred if the distance between the earliest and latest rays is greater than the value of TapSpan/2 and less than TapSpan. If the distance between the earliest and latest rays is greater than TapSpan, Priority 2 re-positioning would normally be inappropriate and Priority 1 re-positioning would be employed.

Figure 6:
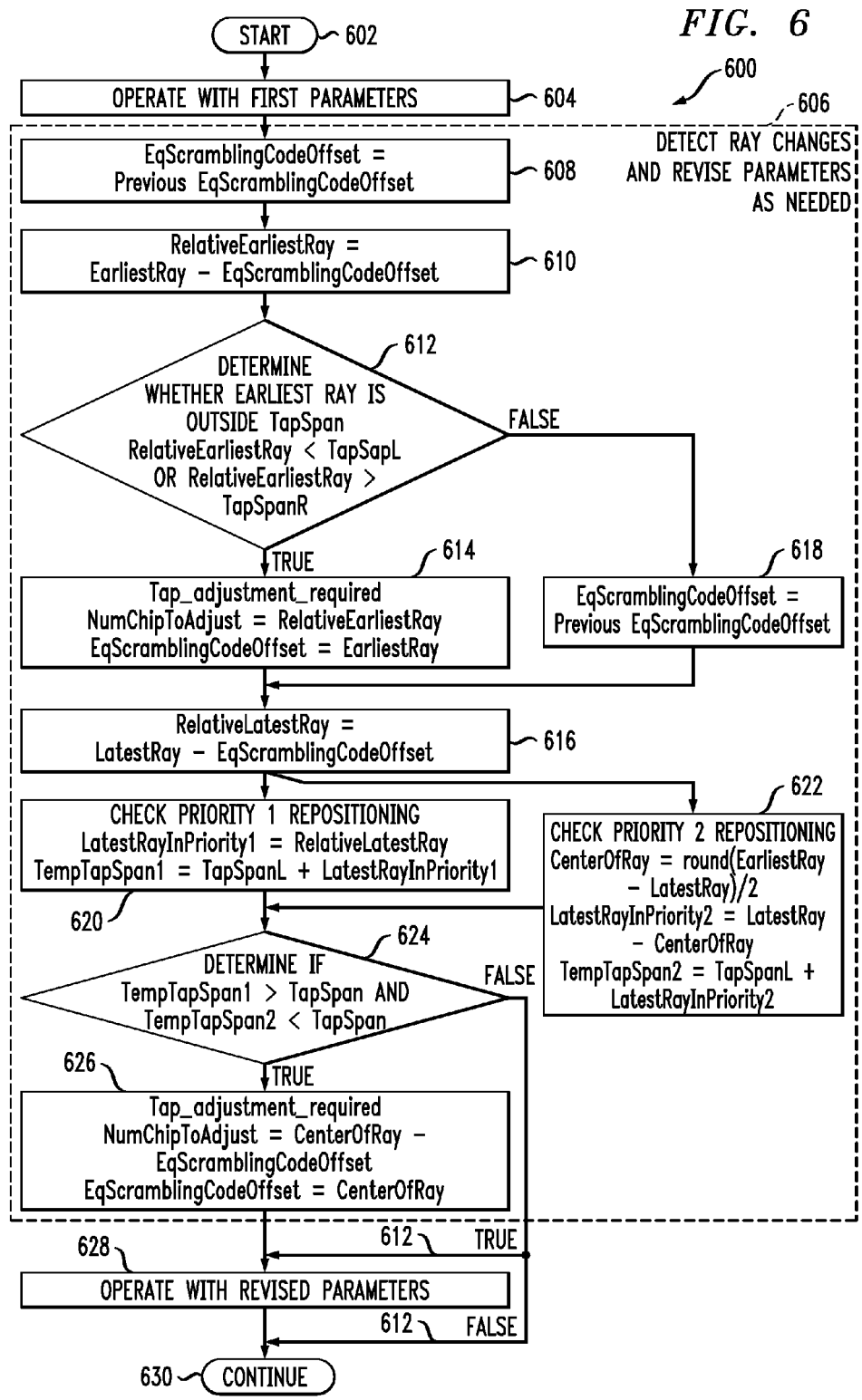
FIG. 6 is a flow chart depicting exemplary method steps for receiving a plurality of time-varying significant rays in a communications circuit, according to yet another aspect of the present invention.

Periodically, microsearcher 134, 234 will provide an update of the significant ray findings, which can then be employed to determine whether tap re-positioning is required. If such is the case, then recalculation of parameters such as NumChipsToAdjust and EqScramblingCodeOffset is appropriate. Reference should now be had to FIG. 6, which depicts a flow chart 600 of method steps in a method of receiving a plurality of time-varying significant rays in a communications circuit. The method can be computer implemented (e.g., using ASICs, DSPs, or other techniques). As shown in FIG. 6, after beginning at block 602, the circuit can be operated with first parameters, such as first sampling span parameters indicative of a first sampling span, as shown at block 604. In block 606, changes in the plurality of rays can be detected. In block 628, operation can proceed with revised parameters. Such operation with revised parameters can be responsive to the changes detected in block 606. The revised parameters can be second sampling span parameters indicative of a second sampling span that is re-positioned temporally, in duration and/or location, with respect to the first sampling span. As will be discussed more fully below, if no substantial changes in the plurality of rays are detected, operation can continue with the original parameters. Furthermore, as indicated by the "continue" block 630, one can continue to loop through the flow chart of FIG. 6, by continuing to monitor for ray changes, and continuing to update the appropriate parameters when substantial or significant ray changes are detected.

The detection in block 606 can typically be directed towards determining whether one or more significant rays have moved outside the first sampling span. As discussed above with respect to the exemplary circuits, the first sampling span can be a first equalizer tap span associated with an equalizer filter, and the second sampling span can be a second equalizer tap span associated with the equalizer filter. The second sampling span parameters can be representative of an amount and/or a direction of re-positioning of the second equalizer tap span with regard to the first equalizer tap span indicated by the first sampling span parameters. As will be discussed more fully below, the second sampling span parameters can be indicative of a mask pattern. The mask pattern can have a number of right zeros, a number of left zeros, and a number of ones. The number of right zeros can be equal to a left tap span plus a relative latest ray position plus a tap guard distance, while the number of left zeros can be equal to the left tap span plus a relative earliest ray position, minus a tap offset distance.

Additional details will now be provided regarding one possible method of performing the detection in detecting step 606. In block 608, the parameter EqScramblingCodeOffset is set equal to the previous value of the EqScramblingCodeOffset. In block 610, a relative earliest ray position is calculated as the absolute earliest ray position minus the equalizer scrambling code offset. In block 612, a determination is made whether the relative earliest ray position is outside of the first sampling span. If such is the case, flow proceeds to block 614, where the tap_adjustment_required flag is set, the number of chips to adjust is calculated as equal to the relative earliest ray position, and a new equalizer scrambling code offset is calculated as equal to the absolute earliest ray position.

If it is determined in block 612 that the relative earliest ray position is not outside of the first sampling span, then in block 618, the equalizer scrambling code offset is set equal to the previous value of the equalizer scrambling code offset (or, thought of in another way, the value of the equalizer scrambling code offset remains unchanged from block 608). In any case, from blocks 614 and 618, processing can proceed to block 616, where the relative latest ray position is calculated as the absolute latest ray position less the equalizer scrambling code offset. In blocks 620 and 622, tentative re-positioning parameters can be determined, corresponding to a tentative sampling span, based on the relative earliest ray position and the relative latest ray position. In the specific example shown in FIG. 6, the tentative re-positioning parameters can correspond to checking of Priority 1 re-positioning, as in block 620, and Priority 2 re-positioning, as in block 622. More specifically, in block 620, a value for the latest ray in Priority 1 can be set equal to the relative latest ray position, and then a first temporary tap span can be calculated as the value of TapSpanL plus the latest ray in Priority 1. In block 622, a center of ray parameter can be calculated by rounding the difference between the earliest ray and the latest ray divided by 2, and the latest ray in Priority 2 can be set equal to the latest ray location less the center of ray parameter. A second temporary tap span can be calculated as equal to the value of TapSpanL plus the latest ray in Priority 2.

In block 624, a determination can be made whether the tentative re-positioning parameters indicate that both the earliest and latest ray will fit in the tentative sampling span. If the indicated relationships in block 624 are both true, then both the earliest and latest rays fit acceptably, and processing at block 626 can be carried out. That is, responsive to determining that the earliest and latest rays fit in the tentative sampling span, the second sampling span parameters can be set equal to the tentative re-positioning parameters. It will be appreciated that in block 626, the parameters calculated in block 614 are overwritten. If the relationship in block 624 is false, then one or both of the rays do not fit in the sampling span corresponding to the tentatively calculated parameters, and the relationships in block 614, or the original relationships, hold. That is, if block 612 was true, there was a change and the branch indicated by "612 TRUE" is followed such that operation proceeds at block 628 with the revised parameters calculated in block 614. Conversely, if block 612 was false, then the path through block 618 was followed, and there has been no change in the parameters, so that operation continues with the first parameters, as indicated by the "612 FALSE" branch.

Figure 7:
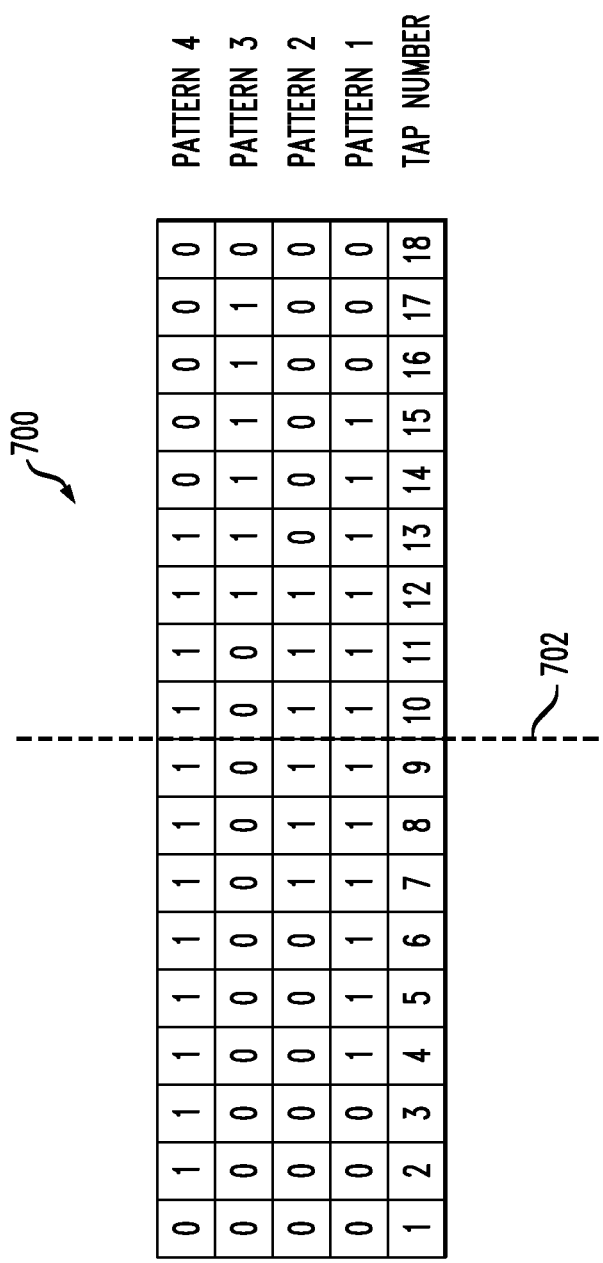
FIG. 7 illustrates use of masking patterns to change size and/or location of a sampling window in accordance with an exemplary embodiment of the present invention.

Attention should now be given to FIG. 7. By way of example, FIG. 7 shows a configuration 700 with 18 physical taps, that is, the parameter N_Taps is equal to 18. In pattern 1, taps 1-3 and 16-18 are masked. In pattern 2, taps 1-6 and 13-18 are masked. Thus, the size, but not the location of the sampling window has been changed in pattern 2 with respect to pattern 1. Note that the location is determined by the center of the sampling window. Both patterns 1 and 2 are centered about the dotted line 702. In pattern 3, taps 1-11 and 18 are masked. Thus, both the size and the location of the sampling window have changed with regard to pattern 1. In pattern 4, taps 1 and 14-18 are masked. Thus, the location but not the size of the window has changed with respect to pattern 1. It will be appreciated that masking refers to applying (e.g., by ANDing as discussed below with respect to FIG. 18) a value of zero (or substantially zero), in locations where significant rays are not expected, and applying a value of 1 (or substantially 1) in locations where significant rays are expected. It will be further appreciated that both the location and size of the sampling window can be moved within the parameters of the 18 physical taps. However, in some cases a significant ray might fall outside the 18 physical taps; in this case, the counter freezing or advancing discussed herein can be employed.

Figure 8:
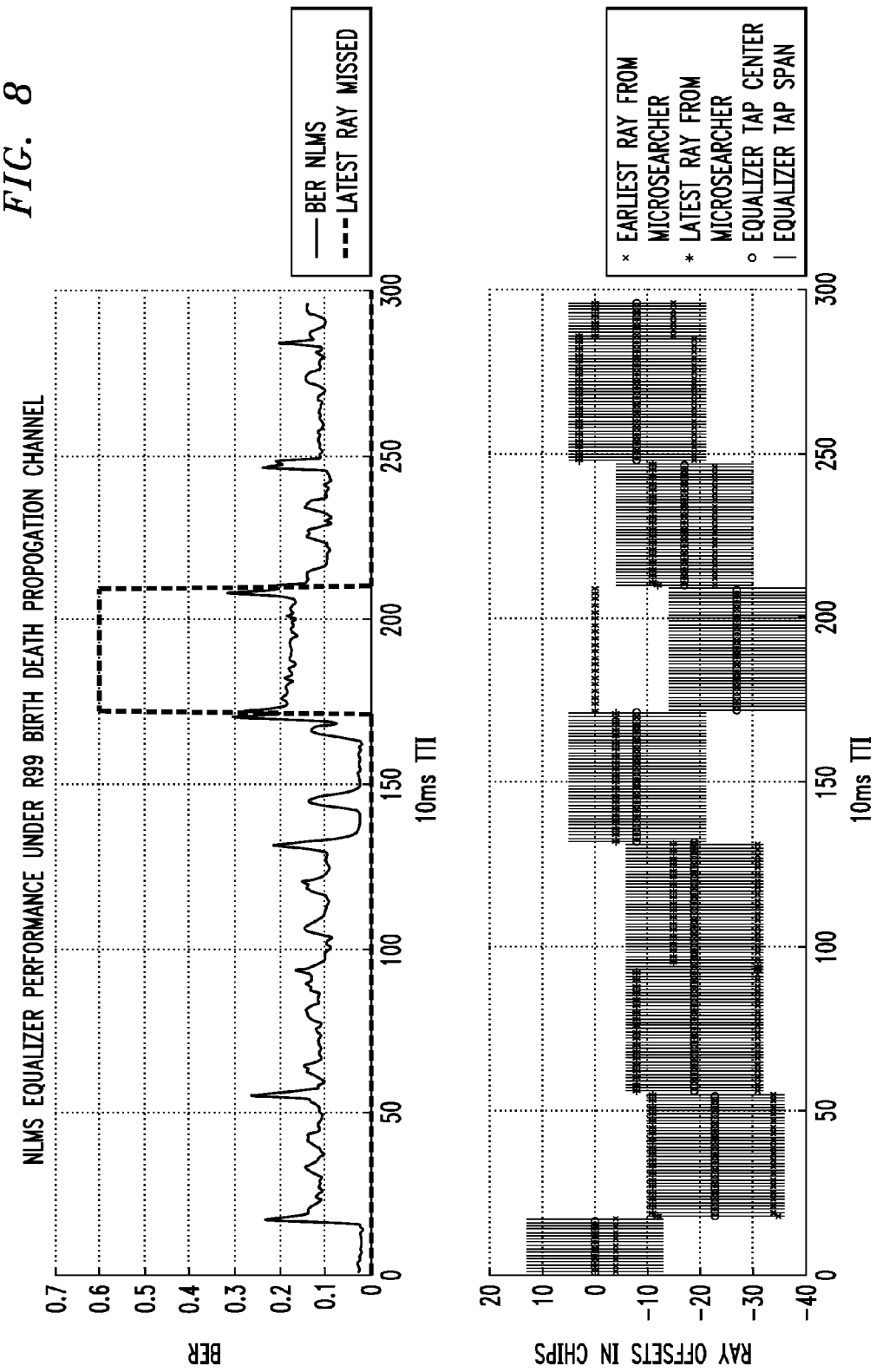
FIG. 8 depicts receiver bit error rate (BER) and tap span allocation when an exemplary embodiment of the present invention is applied under the 3GPP birth and death propagation channel.

FIG. 8 depicts an exemplary application of the present invention to a 3GPP birth and death propagation condition, as specified in 3GPP TS 34.121, Radio Transmission and Reception (FDD) release 5. The figure depicts the tap span of the equalizer when the earliest and latest rays in the channel change constantly. As shown, the BER plot indicates that re-positioning helps the receiver maintain a BER of approximately 0.15. As can be seen, when the equalizer tap span is too short and cannot cover both the earliest and latest rays, the BER degrades as expected.

It will be appreciated that techniques of the present invention, as described herein, may offer one or more of the following advantages. The tap span can be of any desirable fixed size, the solution can be applied not merely on frame boundaries, but as frequently as desired or required (with the only limitation being the frequency of updates from the microsearcher). Furthermore, the techniques can reduce performance loss by positioning the rays within the equalizer tap span such as to minimize equalizer tap re-positioning. Techniques of the present invention can be employed with, for example, software routines that control advanced receivers, such as those that estimate the channel response of a receiver using an adaptive algorithm. In addition to the NLMS type receiver, a Minimum Mean Square Error (MMSE) receiver, or receivers using other techniques, can also be employed.

Figure 11:
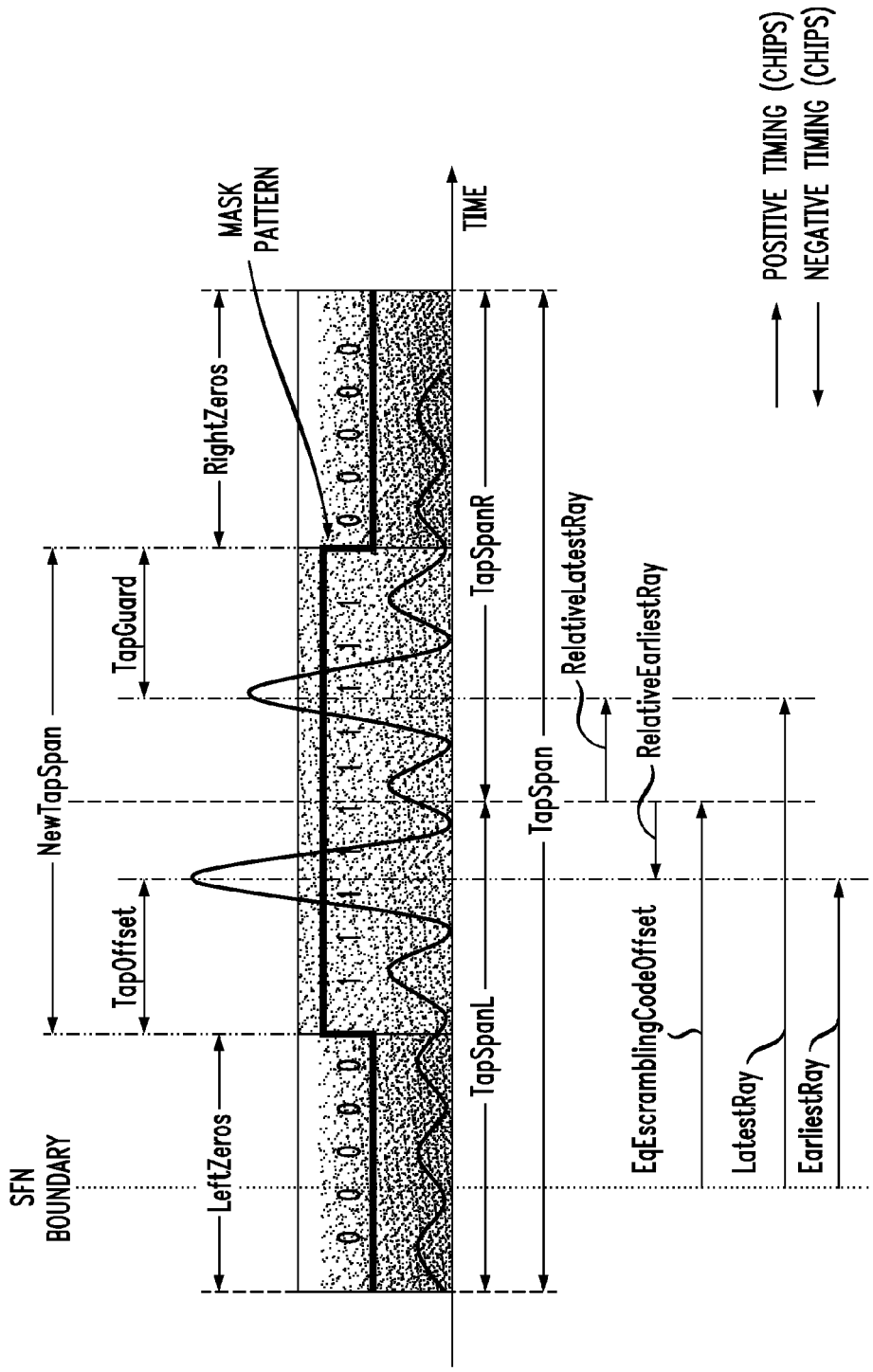
FIG. 11 illustrates parameters pertaining to certain tap span calculation techniques in accordance with aspects of the present invention.

Further details will now be provided regarding one possible exemplary technique, in accordance with an aspect of the present invention, for calculating an appropriate equalizer tap span. The appropriate equalizer tap span can be determined dynamically, based on earliest and latest rays as determined from external hardware or software, such as the aforementioned microsearcher. A mask pattern, such as of ones and zeros as discussed with respect to FIG. 7, can be generated and deployed to vary the equalizer tap span. For illustrative purposes, a chip rate NLMS equalizer receiver is used to illustrate principles of the present invention. Such a receiver employs an adaptive error updating algorithm to calculate the tap weight, which is an estimate of the channel profile over a given window length (that is, tap span). The constantly updated tap weight is then applied to the received samples via FIR filtering to obtain "cleaned up" chips. Two criteria should be met in order to significantly enhance or maximize equalizer performance. First, as illustrated in FIG. 9, all or substantially all the significant rays detected by the microsearcher should be within the fixed equalizer tap span. Second, as depicted in FIG. 10, the tap span should not be excessively wide compared to the ray span. Accordingly, appropriate techniques have been developed to calculate the required tap span. Parameters employed in calculating the tap span are listed in Table 2 below, and are illustrated in FIG. 11. Parameters already listed in Table 1 are not repeated in Table 2.

TABLE 2

| | |
|---|---|
| NewTapSpan | Length of the tap span after the mask pattern is applied to the equalizer tap weights |
| TapOffset | Minimum distance from the beginning of the NewTapSpan to the EarliestRay |
| TapGuard | Minimum distance from the beginning of the LatestRay to the end of the NewTapSpan |
| LeftZeros | Amount of chips to shorten the TapSpan to the left |
| RightZeros | Amount of chips to shorten the TapSpan to the right |

FIG. 11 shows the interrelationship of the various parameters. The indicated techniques for calculating a revised mask pattern can be applied whenever new ray information becomes available, for example, from the microsearcher. The mask pattern can be generated given the two parameters RelativeLatestRay and RelativeEarliestRay. Values should be specified for TapOffset and TapGuard. These are done in a manner to permit the equalizer to capture the full impulse response of the earliest and latest rays. With a fixed tap span, and assuming for illustrative purposes that TapSpanL is ½ the length of TapSpan, the parameters can be calculated from the following equations:

$$RightZeros = TapSpanL + RelativeLatestRay + TapGuard \quad (1)$$

$$LeftZeros = TapSpanL - TapOffset + RelativeEarliestRay \quad (2)$$

$$MaskPattern = 1, RightZeros < i > LeftZeros; 0, otherwise \quad (3)$$

Where i=1 . . . TapSpan

Figure 12:
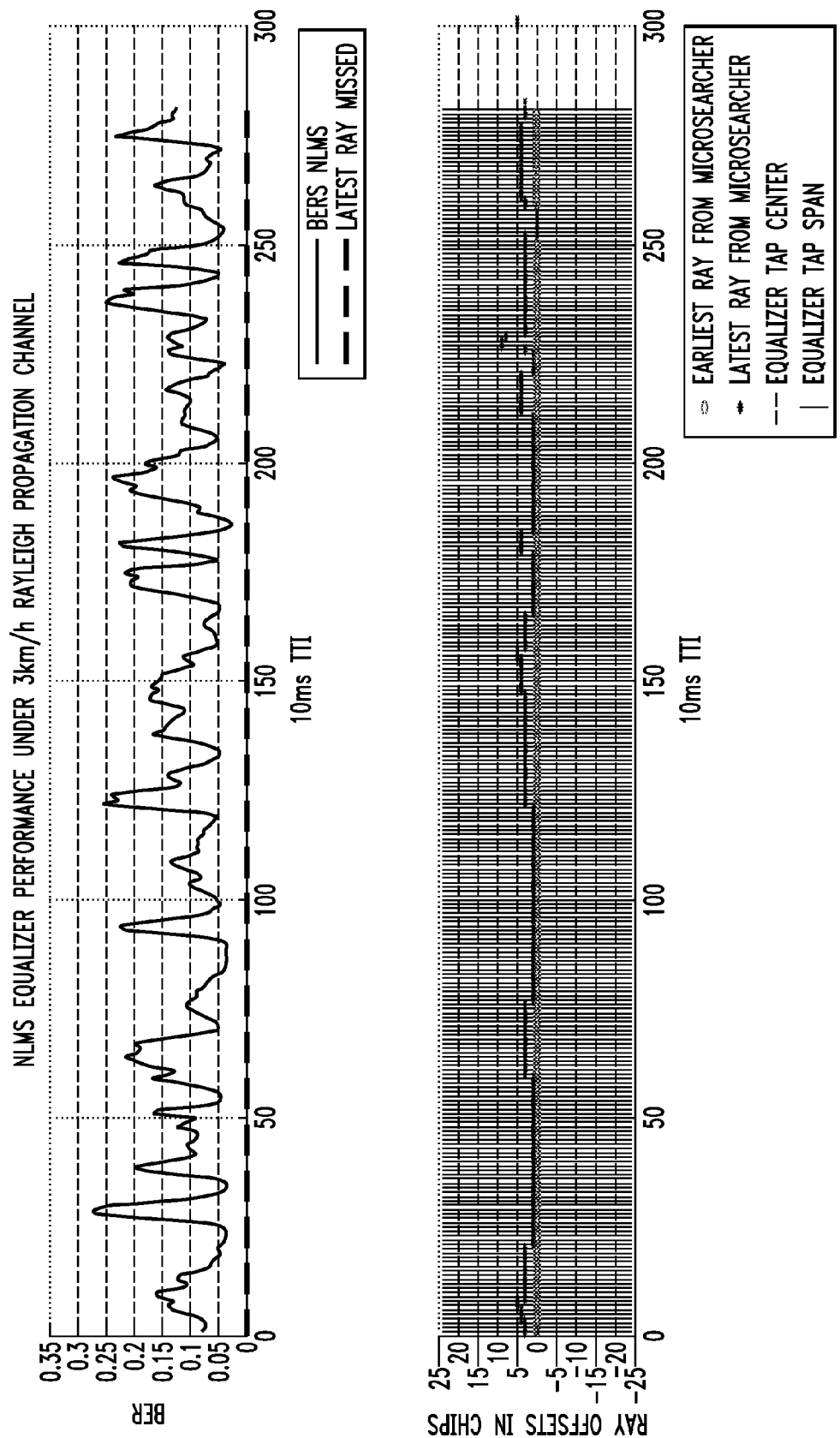
FIG. 12 shows BER using a fixed equalizer tap span in a 3 km/h Rayleigh fading propagation channel.

Note that RelativeEarliestRay and RelativeLatestRay can be positive or negative. In the positive case, the ray position is within TapSpanR; in the negative case, the ray position is within TapSpanL. FIG. 12 shows simulation results for the BER employing a fixed equalizer tap span, under conditions of a 3 km/h Rayleigh fading propagation channel. FIG. 13 shows a similar plot where the tap span is varied by applying the tap masking techniques of the present invention just discussed. In the example of FIG. 13, the tap span is 48 chips with a TapOffest and a TapGuard of 4 chips each. As shown in the figure, the tap span can be shortened or lengthened depending on the position of the latest rays.

Figure 14:
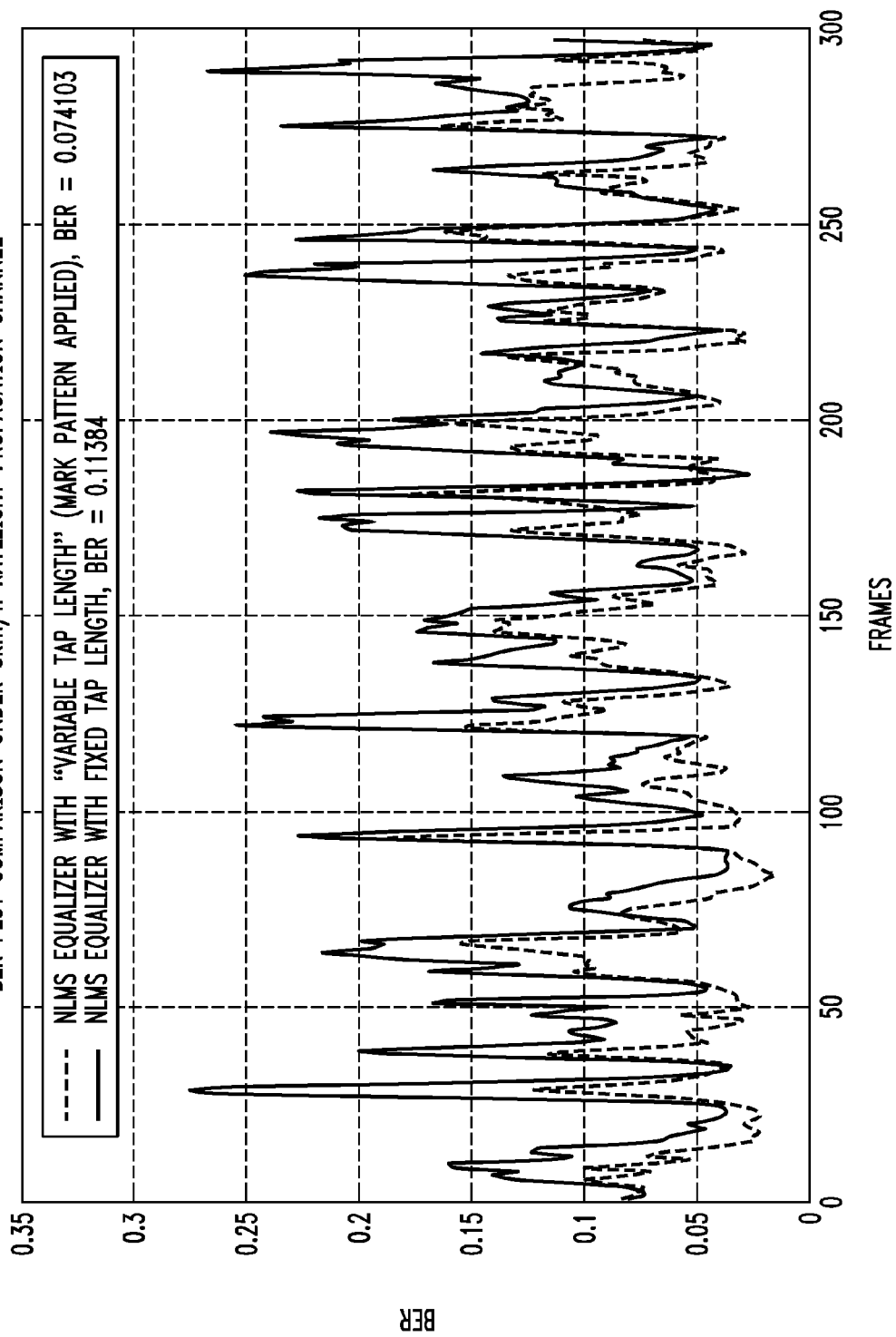
FIG. 14 compares the BER from the cases depicted in FIGS. 12 and 13.

FIG. 14 depicts a BER comparison between the conditions in FIGS. 12 and 13. The average BER over 299 frames is indicated in the legend. Without the use equalizer tap masking techniques of the present invention, approximately a 4.5 dB loss is noted. This is due to allowing the equalizer to estimate large portions of the channel where no significant rays exist. Thus, techniques of the present invention can result in enhanced or maximized performance of a receiver such as a chip rate NLMS equalizer receiver, and can also result in lower power consumption when the equalizer tap span is shortened, as fewer arithmetic operations are needed. Again, it should be noted that the present invention is applicable to a variety of adaptive equalizer receiver architectures.

Figure 15:
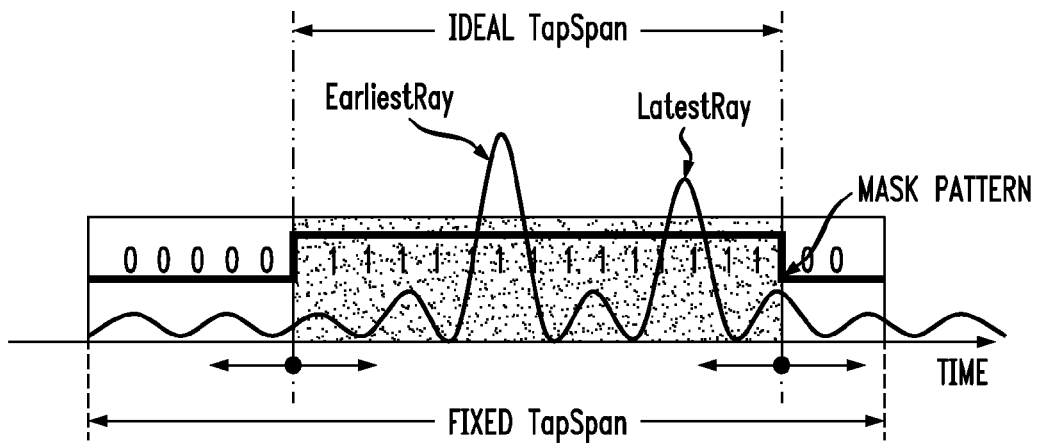
FIG. 15 provides further details about varying tap span using a mask pattern in accordance with principles of the present invention.
Figure 16:
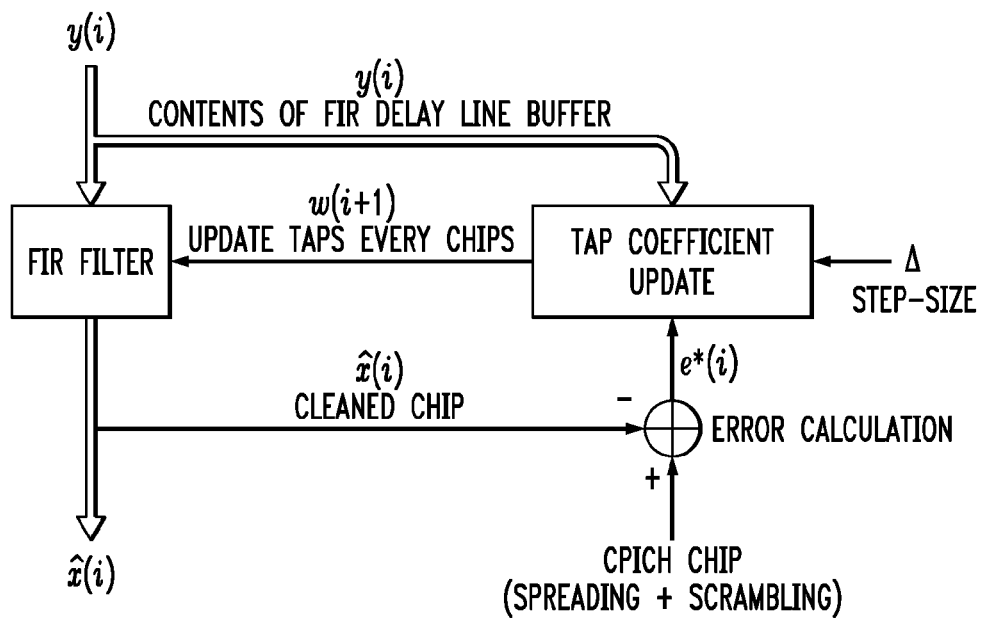
FIG. 16 depicts an architectural diagram for a simple chip rate Normalized Least-Mean Square (NLMS) equalizer receiver.

Additional details will now be presented regarding one exemplary method in which the tap masking techniques just described can be physically implemented. Tap masking can be realized by zeroing out the tap weights at the front and end sections of the equalizer span. Again, for illustrative purposes an NLMS equalizer receiver architecture is used, but is should be understood that other adaptive equalizers can be employed with techniques of the present invention. The tap mask pattern can be determined as discussed above. The application of the tap mask pattern to vary the span of the NLMS equalizer receiver will now be addressed. FIG. 15 depicts a masking pattern applied to the fixed tap span, resulting in the desired tap span referred to as "Ideal Tap Span." FIG. 16 depicts the general architecture of a chip rate NLMS equalizer receiver having a fixed tap span. Such a receiver employs an adaptive error updating algorithm to determine tap weights. The tap weights, which estimate the channel condition, are applied to the received samples y(i) by FIR filtering. The output of the FIR filter becomes the "cleaned" chips x̂(i) ready for descrambling and despreading. The script "R" refers to the real part of an expression and the Script "I" refers to the imaginary part of an expression. In the example depicted in FIG. 16, common pilot channel (CPICH) chips are employed.

Figure 17:
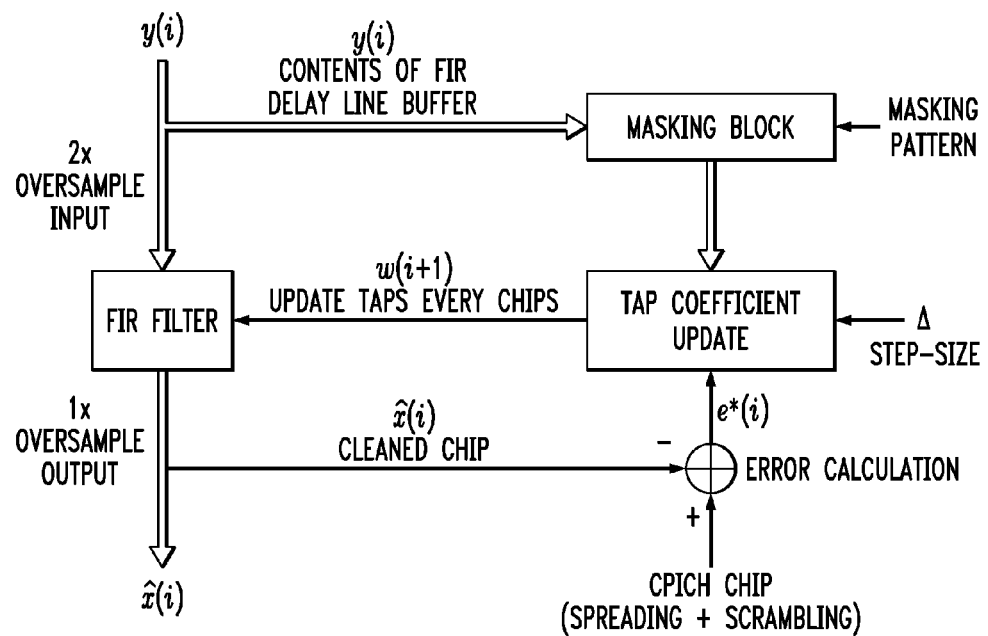
FIG. 17 depicts a diagram similar to FIG. 16 but for a receiver with tap mask capabilities.
Figure 18:
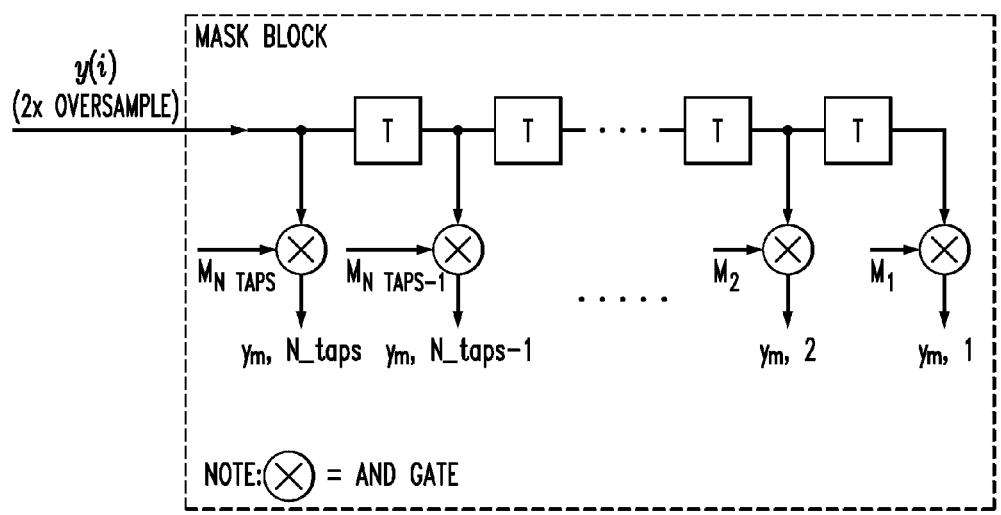
FIG. 18 depicts an exemplary implementation of a masking block using exemplary techniques of the present invention.

FIG. 17 depicts the NLMS receiver architecture with tap masking capabilities according to techniques of the present invention. A masking block is added to mask the content of the input buffer y(i) with the given mask pattern. FIG. 18 shows in detail the logic within the masking block. The mask pattern is a binary bit vector of $N_{taps}$. The binary multiplication performed in the masking block is simply an "AND" operation, thus resulting in a design that is simple to implement and requires only a small amount of logic. Furthermore, the tap span can be readjusted without significant interruption in receiver operation.

Figure 19:
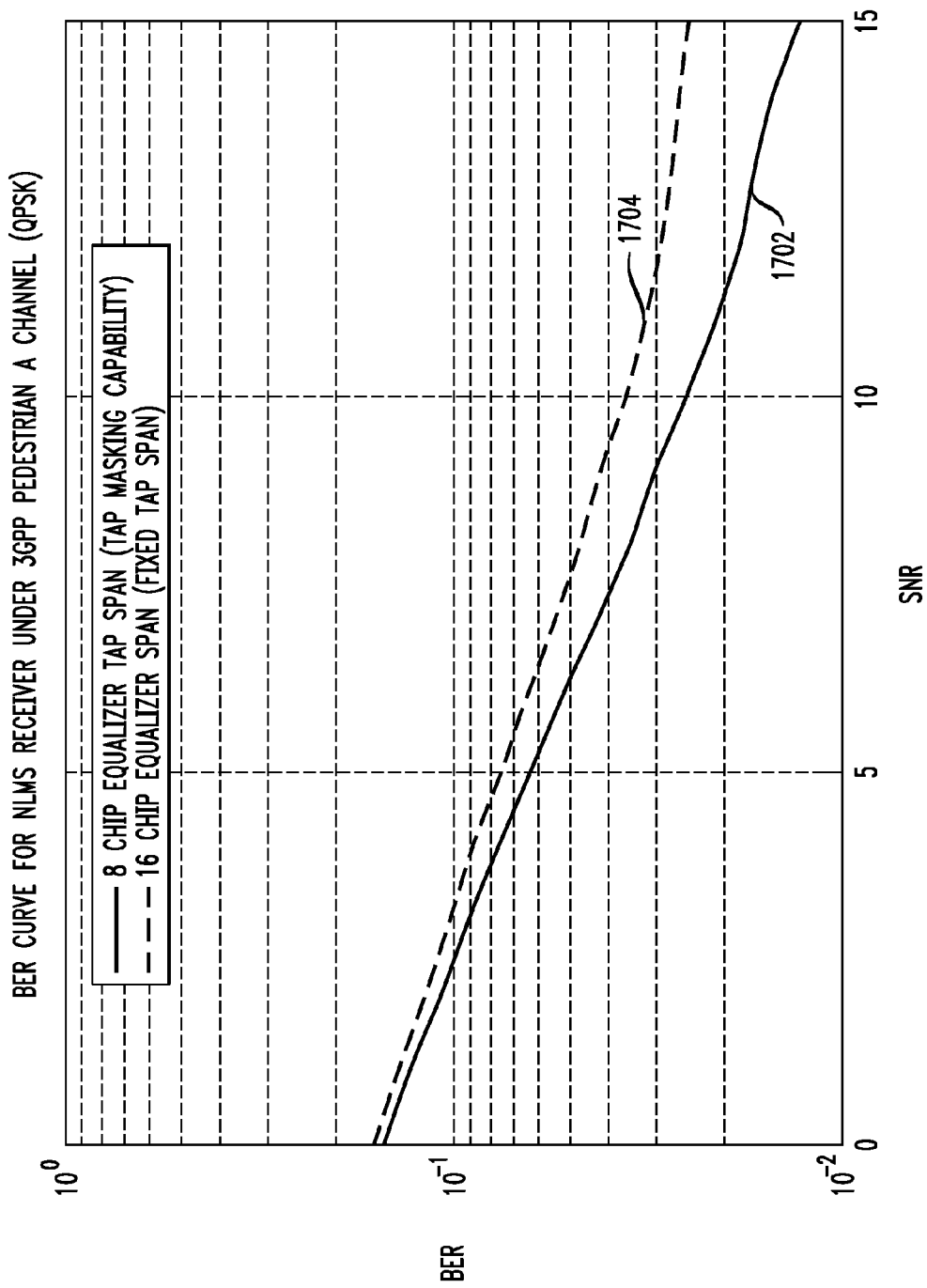
FIG. 19 shows a bit error rate performance curve for an NLMS equalizer with and without tap masking capabilities.

FIG. 19 shows simulation results for the aforementioned release 5 3GPP 3 km/h pedestrian A propagation channel. As can be seen from the BER curves, the BER for the quadrature phase shift keying (QPSK) pedestrian A channel is substantially lower, as shown by curve 1902, for the 8 chip equalizer tap span employing tap masking techniques of the present invention, as compared to the fixed 16 chip equalizer tap span 1704.

At least a portion of the techniques of the present invention described herein may be implemented in an integrated circuit. In forming integrated circuits, a plurality of identical die are typically fabricated in a repeated pattern on a surface on a semiconductor wafer. Each die can include an entire circuit or elements as described herein, and can include other structures or circuits. The individual die are cut or diced from the wafer and then packaged as an integrated circuit. One skilled in the art will know how to dice wafers and package die to produce integrated circuits. Integrated circuits so manufactured are considered part of this invention. Furthermore, when a "chip" is being referred to, it will be apparent from the context whether a multiplied data symbol or an integrated circuit structure is being referred to.

Although illustrative embodiments of the present invention have been described herein, it is to be understood that the invention is not limited to those precise embodiments, and that various other changes and modifications may be made by one skilled in the art without departing from the scope of the invention as set forth in the appended claims.

What is claimed is:

1. An integrated circuit, comprising:
a filter module having a sampling window;
a control module, said control module having a ray parameter interface configured to obtain information indicative of ray changes rendering re-positioning of said sampling window desirable, said control module being configured to determine re-positioning parameters, responsive to said information, that reflect said sampling window re-positioning; and
an input buffer configured to obtain samples of a received signal, said input buffer being further configured to output received signal data;
wherein:
said filter module is coupled to said input buffer to obtain said received signal data and to said control module to obtain said re-positioning parameters, and said filter module and said control module are configured to temporally re-position said sampling window in at least one of duration and location, in accordance with said re-positioning parameters, and to output a filtered chip;
said control module has a sample input port configured to obtain samples of said received signal and is further configured to determine signal sample information;
said input buffer is coupled to said control module and configured to obtain said signal sample information therefrom;
said received signal data output by said input buffer to said filter module comprises received signal array data;
said filter module comprises a weight buffer and a finite impulse response (FIR) filter coupled to said weight buffer, said weight buffer being coupled to said control module to obtain said re-positioning parameters and being configured to provide tap weight data to said FIR filter;
said control module comprises:
an equalizer controller coupled to said ray parameter interface and said input buffer;
a scrambling code generator coupled to said ray parameter interface;
a timing generator coupled to said ray parameter interface; and
a tap update logic module coupled to said equalizer controller and said scrambling code generator;
said equalizer controller is configured to: obtain said information indicative of said ray changes, determine said signal sample information and communicate said signal sample information to said input buffer, and determine tap reset data and communicate said tap reset data to said tap update logic module;
said scrambling code generator is configured to: obtain said information indicative of said ray changes, and determine scrambling code data and communicate said scrambling code data to said tap update logic module;
said timing generator is configured to: obtain said information indicative of said ray changes, and determine counter parameters indicative of at least one of counter freezing and counter advancing; and
said tap update logic module is configured to: obtain said tap reset data and said scrambling code data, and communicate said re-positioning parameters to said weight buffer, said re-positioning parameters comprising at least tap weights for said filter module, said tap weights being determined in accordance with tap masking parameters.

2. A communications circuit, comprising:
an antenna module configured to obtain received signal samples from a signal;
a parameter calculation block configured to obtain ray position data indicative of ray positions associated with said signal, and to generate information indicative of ray changes, responsive to said ray position data;
a filter module having a sampling window;
a control module coupled to said parameter calculation block, said control module being configured to obtain said information indicative of said ray changes, said information rendering re-positioning of said sampling window desirable, said control module being configured to determine re-positioning parameters, responsive to said information, that reflect said sampling window re-positioning; and an input buffer coupled to said antenna module and configured to obtain said received signal samples therefrom, said input buffer being further configured to output received signal data;

wherein said filter module is coupled to said input buffer to obtain said received signal data and to said control module to obtain said re-positioning parameters, and said filter module and said control module are configured to temporally re-position said sampling window in at least one of duration and location, in accordance with said re-positioning parameters, and to output a filtered chip;

a microsearcher coupled to said parameter calculation block and configured to determine said ray position data and supply said ray position data to said parameter calculation block; and a decoder module coupled to said control module and said filter module;

wherein:

said decoder module is configured to obtain said filtered chip from said filter module;

said control module is configured to determine counter parameters indicative of at least one of counter freezing and counter advancing; and said decoder module is further configured to obtain said counter parameters from said control module.

3. A communications circuit, comprising:

an antenna module configured to obtain received signal samples from a signal;

a parameter calculation block configured to obtain ray position data indicative of ray positions associated with said signal, and to generate information indicative of ray changes, responsive to said ray position data;

a filter module having a sampling window;

a control module coupled to said parameter calculation block, said control module being configured to obtain said information indicative of said ray changes, said information rendering re-positioning of said sampling window desirable, said control module being configured to determine re-positioning parameters, responsive to said information, that reflect said sampling window re-positioning; and an input buffer coupled to said antenna module and configured to obtain said received signal samples therefrom, said input buffer being further configured to output received signal data;

wherein:

said filter module is coupled to said input buffer to obtain said received signal data and to said control module to obtain said re-positioning parameters, and said filter module and said control module are configured to temporally re-position said sampling window in at least one of duration and location, in accordance with said re-positioning parameters, and to output a filtered chip;

said information indicative of said ray changes comprises at least earliest ray information indicative of a position of an earliest ray; and said parameter calculation block is configured to generate said information indicative of said ray changes so as to locate said earliest ray substantially centered in said sampling window.

4. A method of receiving a plurality of time-varying rays in a communications circuit, comprising the steps of:

operating said circuit with first sampling span parameters indicative of a first sampling span;

detecting changes in said plurality of rays; and responsive to said changes, operating said circuit with second sampling span parameters indicative of a second sampling span, said second sampling span being temporally re-positioned, in at least one of duration and location, with respect to said first sampling span;

wherein:

said detecting comprises detecting at least one of said rays moving outside said first sampling span;

said first sampling span comprises a first equalizer tap span associated with an equalizer filter;

said second sampling span comprises a second equalizer tap span associated with said equalizer filter;

said second sampling span parameters are representative of at least one of an amount of re-positioning and a direction of re-positioning, of said second equalizer tap span, as compared to said first equalizer tap span, as indicated by said first sampling span parameters; and said second sampling span parameters are indicative of a mask pattern having a right substantially zero region, a left substantially zero region, and a substantially one region, said right substantially zero region being sized equal to a left tap span plus a relative latest ray position plus a tap guard distance, said left substantially zero region being sized equal to said left tap span plus a relative earliest ray position minus a tap offset distance.

5. A method of receiving a plurality of time-varying rays in a communications circuit, comprising the steps of:

operating said circuit with first sampling span parameters indicative of a first sampling span;

detecting changes in said plurality of rays; and responsive to said changes, operating said circuit with second sampling span parameters indicative of a second sampling span, said second sampling span being temporally re-positioned, in at least one of duration and location, with respect to said first sampling span;

wherein:

said detecting comprises:

detecting at least one of said rays moving outside said first sampling span;

calculating a relative earliest ray position as an earliest ray position of an earliest ray minus an equalizer scrambling code offset;

determining whether said relative earliest ray position is outside of said first sampling span; and responsive to determining that said relative earliest ray position is outside of said first sampling span:

determining that tap adjustment is required;

calculating a number of chips to adjust as equal to said relative earliest ray position; and calculating a new equalizer scrambling code offset as equal to said earliest ray position.

6. The method of claim 5, wherein said detecting further comprises:

calculating a relative latest ray position equal to a latest ray position of a latest ray minus said new equalizer scrambling code offset;

determining tentative re-positioning parameters, corresponding to a tentative sampling span, based on said relative earliest ray position and said relative latest ray position;

determining whether said tentative re-positioning parameters indicate fitting of both said earliest ray and said latest ray in said tentative sampling span; and responsive to determining that said earliest ray and said latest ray fit in said tentative sampling span, setting said second sampling span parameters equal to said tentative re-positioning parameters.

* * * * *